Figure 1:
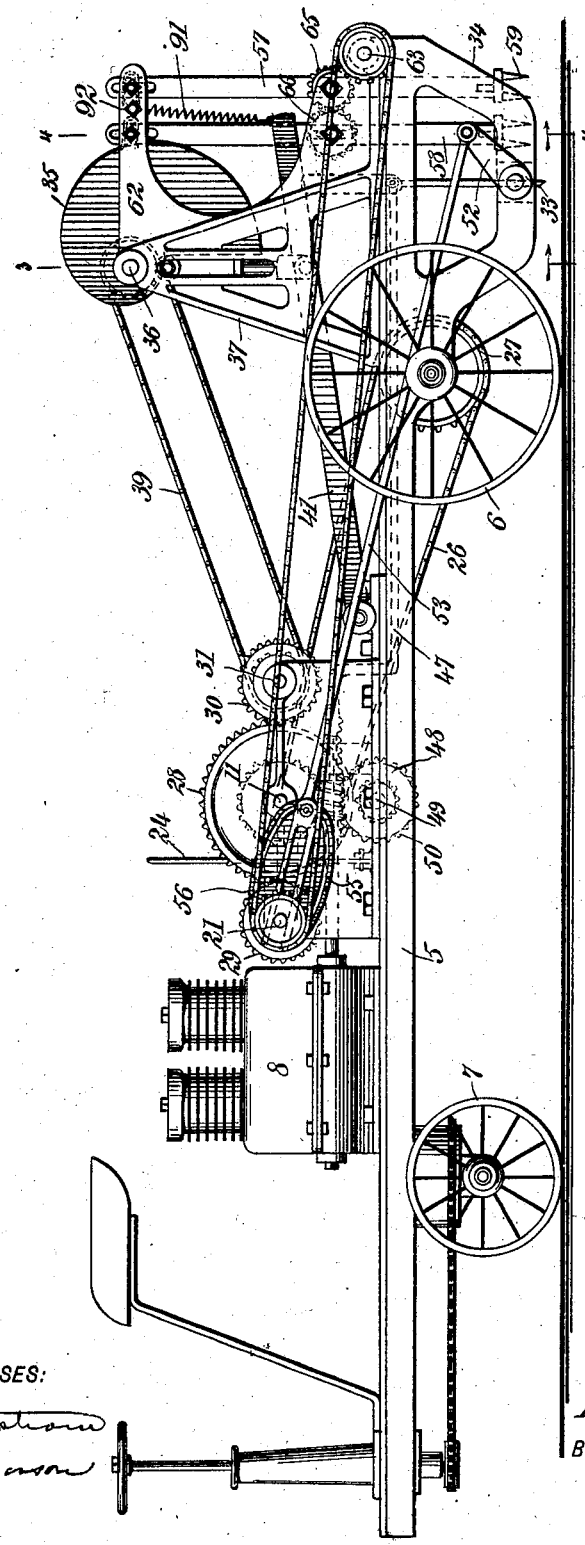

No. 721,585. PATENTED FEB. 24, 1903.
D. LUBIN.
MOTOR OPERATED AGRICULTURAL MACHINE.
APPLICATION FILED SEPT. 10, 1902.

NO MODEL. 3 SHEETS—SHEET 1.

WITNESSES:

INVENTOR
David Lubin
BY
ATTORNEYS.

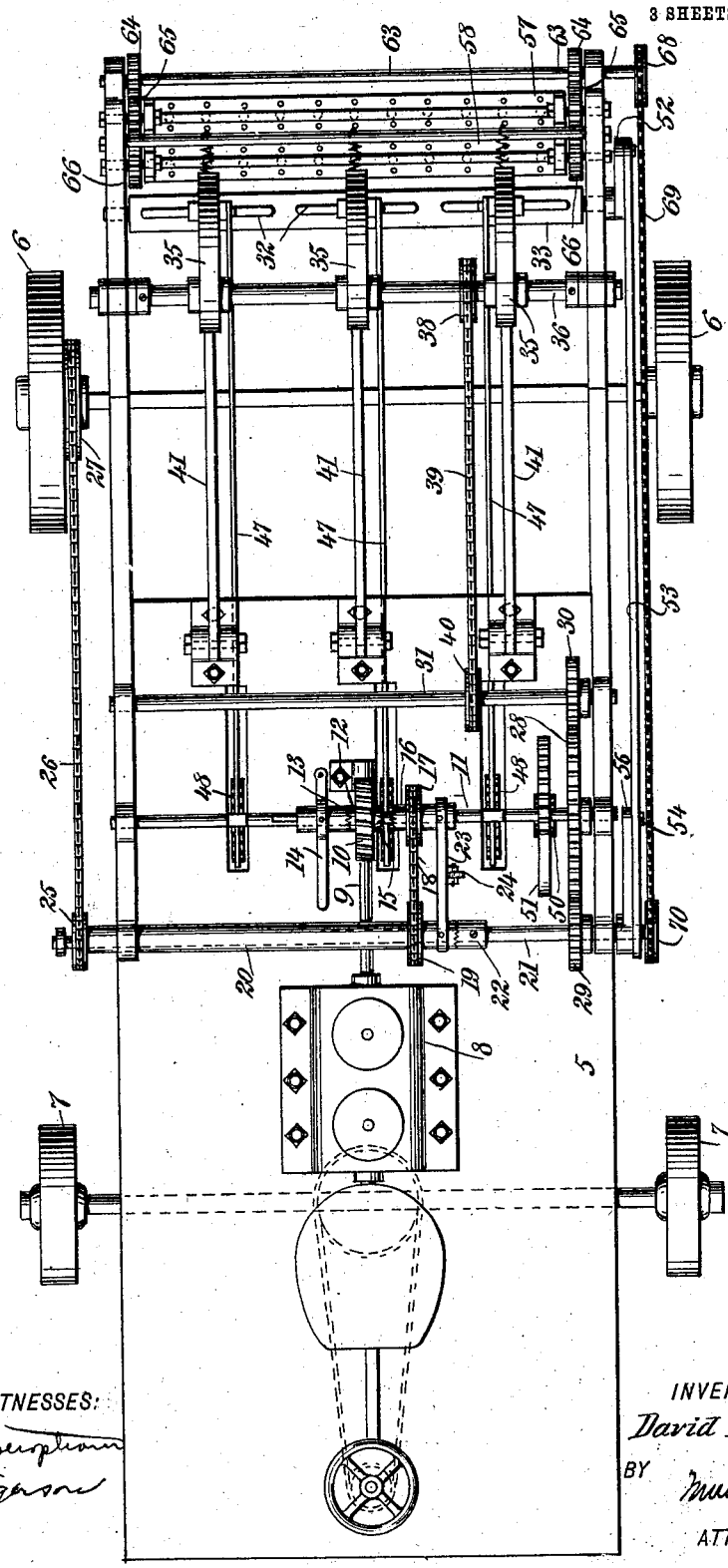

No. 721,585. PATENTED FEB. 24, 1903.
D. LUBIN.
MOTOR OPERATED AGRICULTURAL MACHINE.
APPLICATION FILED SEPT. 10, 1902.
NO MODEL. 3 SHEETS—SHEET 3.
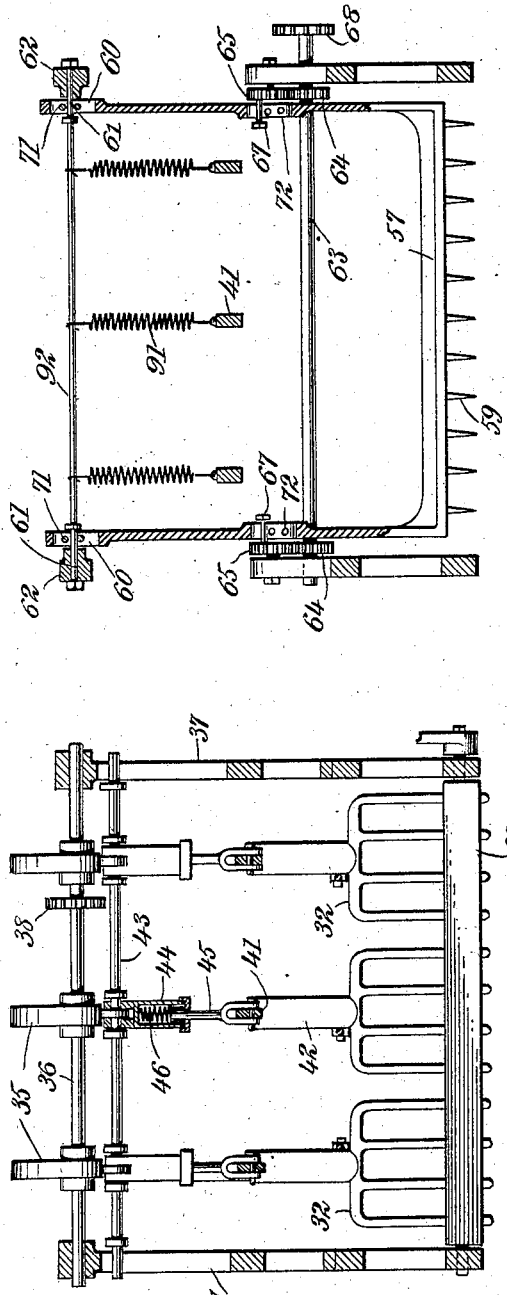
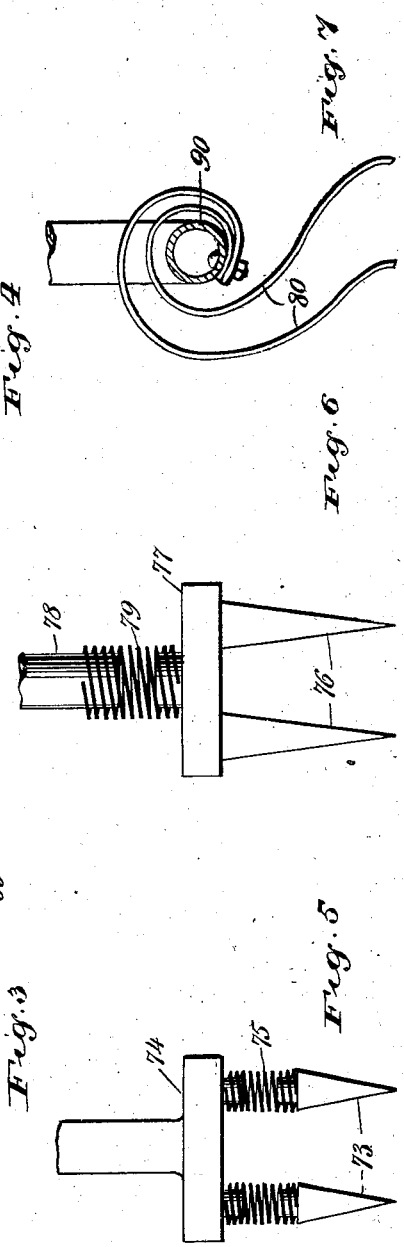
WITNESSES:
INVENTOR
David Lubin
BY
ATTORNEYS.

UNITED STATES PATENT OFFICE.

DAVID LUBIN, OF NEW YORK, N. Y.

MOTOR-OPERATED AGRICULTURAL MACHINE.

SPECIFICATION forming part of Letters Patent No. 721,585, dated February 24, 1903.

Application filed September 10, 1902. Serial No. 122,811. (No model.)

*To all whom it may concern:*

Be it known that I, DAVID LUBIN, a citizen of the United States, and a resident of the city of New York, borough of Manhattan, in the county and State of New York, have invented a new and Improved Motor-Operated Agricultural Machine, of which the following is a full, clear, and exact description.

This invention relates to improvements in agricultural machines, the object being to provide a machine with a motor-operated mechanism, whereby the digging devices are forced into the ground and then the machine moved forward one step as the digging devices are lifted with the earth and breaking devices rapidly operated to finally pulverize the lifted earth.

I will describe a motor-operated agricultural machine embodying my invention and then point out the novel features in the appended claims.

Reference is to be had to the accompanying drawings, forming a part of this specification, in which similar characters of reference indicate corresponding parts in all the figures.

Figure 1 is a side elevation of an agricultural machine embodying my invention. Fig. 2 is a plan view thereof. Fig. 3 is a section on the line 3 3 of Fig. 1. Fig. 4 is a section on the line 4 4 of Fig. 1, and Figs. 5, 6, and 7 show modifications in the breaking devices.

The machine comprises a platform or frame 5, mounted on rear wheels 6 and front wheels 7, and a suitable steering mechanism is connected with the axle of the front wheels. Mounted on the vehicle is a motor 8, which may be a gasolene or similar combustion-engine. On the shaft 9 of the motor is a worm engaging with a worm-wheel 10, mounted loosely on the main shaft 11. On one side of the worm-wheel 10 is a clutch member 12 for engaging with a clutch member 13, mounted to slide on the shaft 11, but designed to rotate therewith.
As here shown, the shaft is provided with a feather for engaging in a channel formed in the clutch 13. The clutch 13 is moved lengthwise on the shaft by means of an ordinary lever 14. The opposite side of the worm-wheel 10 is provided with a clutch member 15, designed at certain times to be placed in engagement with a clutch member 16, to which is attached a sprocket-wheel 17. This clutch member 16, with its sprocket-wheel 17, is movable lengthwise of the shaft 11, and from the sprocket-wheel 17 a chain 18 extends to a sprocket-wheel 19, connected to a sleeve 20, mounted to slide on a shaft 21. Rigidly attached to the shaft 21 is a clutch member 22 for engaging with a clutch member on the sleeve 20, as clearly indicated in Fig. 2.

The sleeve 20 and also the hub of the sprocket-wheel 17, which carries the clutch member 16, are provided with angular channels receiving pins extended from a shifting-bar 23, operated by a lever 24. On the outer end of the sleeve 20 is a sprocket-pinion 25, in which a chain 26 extends to a sprocket-wheel 27, attached to the axle to which the rear wheels 6 are rigidly connected, it being understood that the axle is mounted to rotate in bearings in the frame.

Mounted on the shaft 11 is a mutilated gear 28, designed to operate alternately a pinion 29 on the shaft 21 and a pinion 30 on a counter-shaft 31.

Arranged at the rear portion of the vehicle is a digging device which, as here shown, consists of a series of forks 32, which are carried by and are movable through a rock-shaft 33, having bearings in depending portions 34 of the vehicle-frame platform. As a means for forcing the digging devices into the ground I employ cams 35, mounted on a shaft 36, having bearings in standards 37. Mounted on the shaft 36 is a sprocket-pinion 38, from which a chain 39 extends to a sprocket-pinion 40 on the shaft 31. The cams 35 in their rotation are designed to force downward levers 41, which engage directly with the upper extensions 42 on the digging-tines. The said levers 41 are connected to a rod 43, movable vertically in guides formed in the uprights 37 by means of cushioned links, each link consisting of a tube 44, having swinging connection with the rod 43, and a rod 45, connected directly to the lever 41 and extended into the tube 44, a spring 46 being arranged between the upper end of the rod 45 and the top wall of the sleeve. By this cushioned arrangement should one or more of the forks while being forced into the ground come in contact with a stone or other obstruction its spring will permit the continued downward movement of the rod 43 to force the other tine or tines into the ground, and therefore there will be no danger of breaking the tine coming in contact with the obstruction.

From the upper portion of each digging device or set of tines a draw-rod 47 extends forward and is provided with a rack portion for engaging with a pinion 48, mounted on a shaft 49, on which is secured a pinion 50, designed to be engaged by the teeth of a mutilated gear 51 to draw the tines forward after discharging the load of dirt, as will be more clearly described hereinafter.

On one end of the rock-shaft 33 is a crank 52, from which a rod 53 extends forward, and this rod 53 is provided with a crank-pin 54, engaging in a cam-slot 55, formed in a cam-disk 56, mounted on the shaft 21.

Rearward of the digging devices are breaking or pulverizing devices. In Figs. 1, 2, and 3 I have shown two sets of breaking devices arranged in frames 57 and 58, one arranged forward of the other. On the lower bar of each frame is a series of teeth 59, which in the figures above mentioned are in the form of drag-teeth. The upper ends of the side members of the frames 57 and 58 are slotted, as indicated at 60, and passing through these slots are studs 61, extended inward from rearwardly-extended arms 62 on the uprights 37. At the rear end of the machine is arranged a shaft 63, connected to which are pinions 64, these pinions 64 meshing with pinions 65, the said pinions 65 being in engagement with pinions 66. The pinions 65 have crank-pins 67, which pass into slots formed in the side members of the frame 57 and similar crank-pins on the pinions 66 pass into the slots formed in the side members of the frame 58.

From a sprocket-wheel 68 on the shaft 63 a chain 69 extends to a sprocket-wheel 70 on the outer end of the shaft 21. It is designed that these breaking devices shall in some instances, such as when the machine is operating in light soil, have a forward-and-backward or dragging motion through the earth lifted by the digging devices, and in other instances when the machine is operating in heavy soil, such as clay, the breaking devices require, it is found, more power to break or pulverize the earth, and in such cases the breaking devices not only have the back-and-forth swinging motion, but have a downward or pounding motion. In the first case the frames will be mounted to swing without vertical motion on the studs 61. To provide for this, I employ staples 71, which may be passed through openings formed in the upper portions of the side members of the frame and of course across the slots 60. These staples, therefore, will form the bearings. Therefore as the shaft 63 is rotated the pinions having the crank-pins in their rotation will impart a to-and-fro or back-and-forth swinging motion to the breaking devices in a slight arc of a circle. In the second instance or where heavy ground is operated upon the staples 71 are shifted into holes 72, so as to pass across the slots receiving the crank-pins, thus forming bearings for the crank-pins. It is obvious that when so arranged the cranks will be moved in such a manner as to carry the breaking devices in a circular direction, the upper ends of the side members of the frame of course sliding up and down on the studs 61. By the quick downward movement at the rear end of the stroke of the breaking devices it is obvious that they will be moved quickly downward to pound into the earth and finally pulverize it.

In Fig. 5 I have shown breaking devices consisting of drag or like teeth 73, which have yielding connection with the bottom bar of a frame 74, designed to be operated in the manner above described. The teeth 73, as here shown, are connected to said bar 74 by means of springs 75, connected at their lower ends to studs on the upper ends of the teeth and at their upper ends to studs on the lower side of the bar 74.

In Fig. 6 I have shown teeth 76 as rigidly connected to a bar 77, and this bar 77 is yieldingly connected to the side members 78 of the operating-frame through the medium of springs 79. By means of these springs 75 and 79 it is obvious that should the breaking devices 73 or 76 engage with a stone or other obstruction raised by the digging devices they will yield without danger of breaking.

In Fig. 7 I have shown the breaking devices as consisting of spring-yielding teeth 80. These spring-yielding teeth are of spiral form and arranged in pairs on the cross-bar 90 of the swinging or oscillating frame. From the free end of each lever 41 a spring 91 extends upward and connects with a rod 92, supported by the arms 62.

In the operation the teeth of the mutilated gear 28 will engage with the pinion 30 and rotate the shaft 31, which through the medium of its gear connection with the shaft 36 will cause a rotation of said shaft 36, and consequently rotate the cams 35. These cams 35 will force the levers 41 downward, and the levers by engaging with the upper projections of the tines will force the tines into the ground, at this time the tines of course being in a vertical plane. The teeth of the mutilated gear 28 will now engage with the pinion 29, which will rotate the shaft 21 and the sleeve 20, which is in clutch connection therewith, and through the medium of the chain-gearing move the machine one step forward, and during this movement the cam 56 will rock the rock-shaft 33, carrying the digging-tools upward with the load of earth thereon. At the same time the breaking devices will be operated in the manner before described. Just before coming to a stop the mutilated gear 51 will cause a rotation of the shaft 49, which will cause the draw bars or rods 47 to pull the digging-tines forward, so that they have a projection through the rock-shaft or stand in their normal position with relation to the rock-shaft, as indicated in Fig. 1. The cam 56 will now return the rock-shaft to normal position, bringing the digging devices to a vertical position, and of course the springs 91 will move the levers 41 upward to a normal position.

Having thus described my invention, I claim as new and desire to secure by Letters Patent—

1. In an agricultural machine, a carriage, a motor thereon, digging devices carried by the carriage, breaking devices carried by the carriage, and a mechanism operated by the motor, for forcing the digging-tines into the ground and then moving the carriage forward while lifting the digging devices and operating the breaking devices, substantially as specified.

2. In an agricultural machine, a carriage, a motor thereon, digging devices carried by the carriage, breaking devices carried by the carriage, and a mechanism operated by the motor for forcing the digging devices into the ground and then moving the carriage forward while lifting the digging devices, and at the same time imparting a to-and-fro motion to the breaking devices.

3. In an agricultural machine, a carriage, a motor thereon, a driving connection between the motor and carriage, digging devices on the carriage, operated by the motor, a frame rearward of the digging devices, means operated by the motor for causing an oscillating movement to the frame, and breaking devices carried by the frame.

4. In an agricultural machine, a carriage, a motor thereon, digging devices mounted on the carriage, cams operated from the motor, for forcing the digging devices into the ground, and breaking devices rearward of the digging devices.

5. In an agricultural machine, a carriage, a motor thereon, digging devices on the carriage, means operated by the motor for forcing the said digging devices into the ground, means for swinging said digging devices, operated from the motor, swinging frames arranged rearward of the digging devices, breaking devices carried by said frames, and means actuated by the motor for swinging said frames.

6. In an agricultural machine, a carriage, a motor thereon, a driving connection between the motor and carriage, digging devices operated by the motor while the carriage is stationary, frames mounted to oscillate or swing at the rear portion of the carriage, breaking devices on the frames, adjustable bearings for said frames, and means operated from the motor for swinging said frames.

7. In an agricultural machine, a carriage, a motor thereon, a driving connection between the motor and carriage, digging devices supported on the carriage and operated by said motor, breaking devices rearward of the digging devices, and means actuated by the motor for causing a back-and-forth swinging motion of the breaking devices.

8. In an agricultural machine, a carriage, a motor thereon, a rock-shaft supported in the carriage, digging devices movable through said rock-shaft but swinging therewith, levers for engaging with the digging devices, a vertically-movable rod, cushioned links connecting said rod with the levers, and cams operated from the motor, for forcing said links and levers downward.

In testimony whereof I have signed my name to this specification in the presence of two subscribing witnesses.

DAVID LUBIN.

Witnesses:
 FRED E. PITKIN,
 GEORGE SMITH.